US 6,873,722 B2

(12) United States Patent
Hercke et al.

(10) Patent No.: US 6,873,722 B2
(45) Date of Patent: Mar. 29, 2005

(54) METHOD OF QUALITATIVELY ASCERTAINING THE POSITION AND DEGREE OF SEVERITY OF CHATTER MARKS IN A FINE-MACHINED SURFACE OF A WORKPIECE

(75) Inventors: Tobias Hercke, Stuttgart (DE); Norbert Rau, Kirchheim (DE); Michael Seibold, Schwaebisch Gmuend (DE)

(73) Assignee: DaimlerChrysler AG, Stuttgart (DE)

( * ) Notice: Subject to any disclaimer, the term of this patent is extended or adjusted under 35 U.S.C. 154(b) by 606 days.

(21) Appl. No.: 09/855,845

(22) Filed: May 16, 2001

(65) Prior Publication Data

US 2002/0009221 A1 Jan. 24, 2002

(30) Foreign Application Priority Data

May 16, 2000 (DE) .......................................... 100 23 954

(51) Int. Cl.$^7$ ................................................ G06K 9/00
(52) U.S. Cl. ...................... 382/152; 700/175; 356/237.2
(58) Field of Search ................................ 382/152, 154, 382/278, 141, 145; 700/145, 159, 167, 174, 175, 183; 348/92, 93, 125, 129, 130; 250/559.39; 702/33–35; 356/237.1, 237.2; 33/553, 551, 545, 546

(56) References Cited

U.S. PATENT DOCUMENTS 5,272,443 A * 12/1993 Winchip et al. ............ 324/662
5,627,771 A * 5/1997 Makino ...................... 702/155
5,771,310 A * 6/1998 Vannah ...................... 382/154
5,808,735 A * 9/1998 Lee et al. ................ 356/237.2
6,067,720 A * 5/2000 Heilbronner et al. ......... 33/553

FOREIGN PATENT DOCUMENTS

DE          197 40 141          4/1999

* cited by examiner

Primary Examiner—Bhavesh M. Mehta
Assistant Examiner—John Strege
(74) Attorney, Agent, or Firm—Crowell & Moring LLP

(57) ABSTRACT

The invention relates to a method of contactlessly ascertaining chatter marks in finely-machined workpiece surfaces, with the following steps: a contactlessly operating, high-resolution surface-measuring method is used to generate from the workpiece surface a data record representing the actual microtopography of the workpiece surface, to take away from this a data record representing the idealized macroform of the workpiece surface, and in this way to generate a data record representing the flat-extended form of the microtopography of the workpiece surface. This data record is subjected to a digital in-phase bandpass filtering with respect to its circumferential waviness, the waviness of interest here of the chatter marks preferably being allowed through. The data record formed in this way is for its part subjected to a stationary multiple cross correlation with respect to the transverse direction. This produces an only two-dimensional data record representing the circumferential position of any chatter marks on the workpiece surface and their degree. To form a characteristic assessment number for chatter marks, the chatter-mark data record can be further evaluated, for example by two-stage averaging.

16 Claims, 6 Drawing Sheets

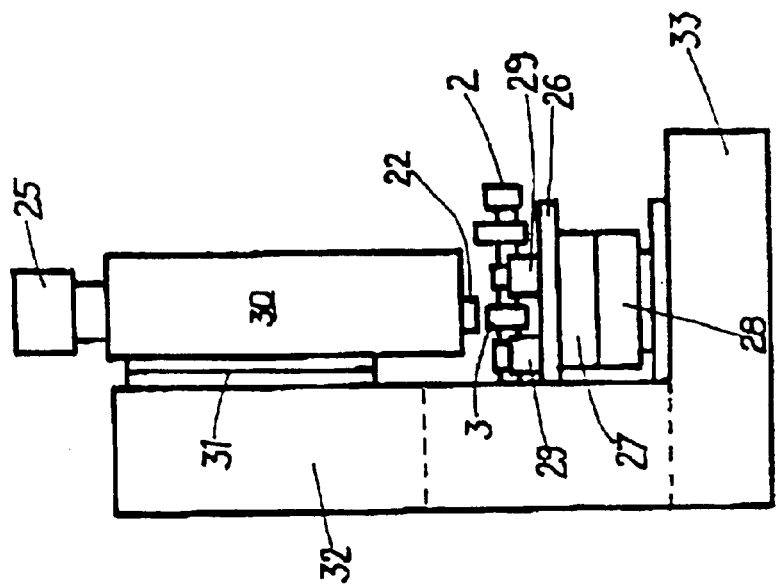
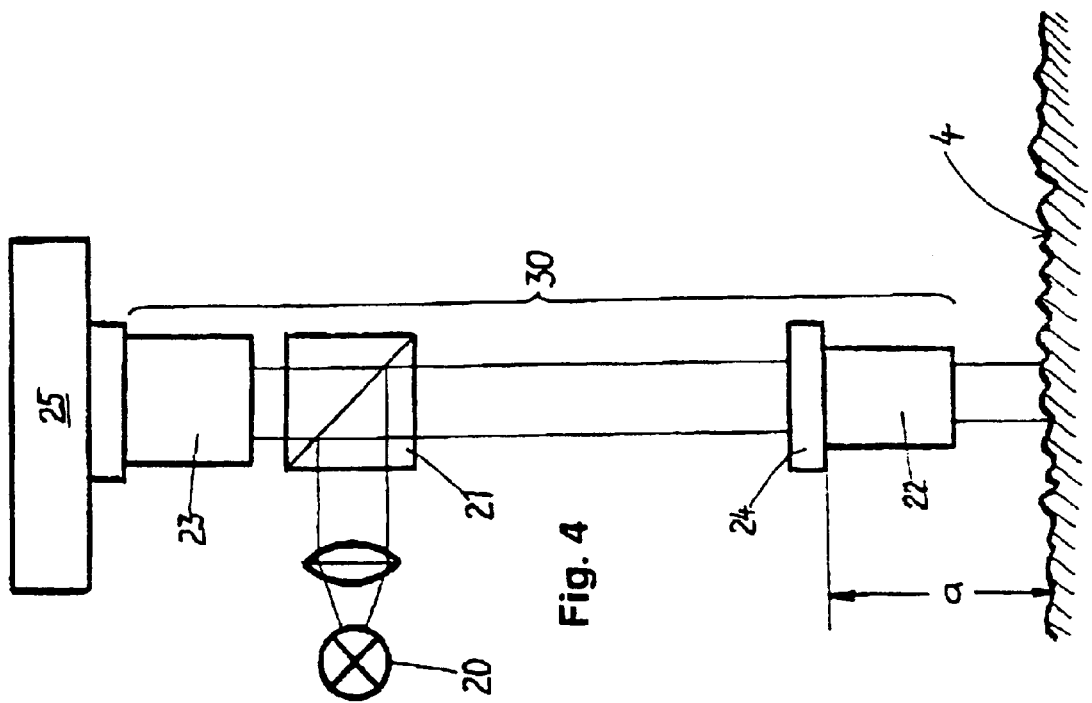

METHOD OF QUALITATIVELY ASCERTAINING THE POSITION AND DEGREE OF SEVERITY OF CHATTER MARKS IN A FINE-MACHINED SURFACE OF A WORKPIECE

BACKGROUND AND SUMMARY OF THE INVENTION

This application claims the priority of German Application No. 100 23 954.4, filed May 16, 2000, the disclosure of which is expressly incorporated by reference herein.

The invention relates to a method of qualitatively ascertaining the position and degree of severity of chatter marks formed in a finely-machined surface of a workpiece.

Chatter marks may occur under certain circumstances during the machining of workpiece surfaces. They are disruptive, in particular when they occur during the final machining, that is the fine machining, of the workpiece surface. This is because they then remain on the workpiece and can have a disruptive effect during the operation of a machine containing this workpiece, in particular due to noise generation and/or impairment of the service life. The causes of chatter marks being produced have not been definitively clarified, in particular not for all fine-machining processes. The fine-machining process most frequently used is grinding. Here, chatter marks are particularly disruptive when they extend axially over the entire width of the ground workpiece surface.

The problem with chatter marks has arisen in recent times in particular in the case of internal combustion engines or their camshafts, which interact with roller tappets. On the one hand, the cam surfaces sometimes have concave portions, that is, turning points in the cam profile, at which the risk of chatter marks forming is particularly acute. On the other hand, roller tappets react with particular sensitivity to chatter marks by producing noise. Flat-base tappets are much more tolerant in this respect.

Although the problem of chatter marks appears to be most urgent where camshafts are concerned, chatter marks likewise occur on other finely-machined machine parts, where they are likewise disruptive. For example, chatter marks on bearing surfaces lead to bearing vibrations, not only in the case of rolling bearings, where this is obviously so, but also in the case of sliding bearings. Bearing vibrations of this type manifest themselves in a corresponding development of noise. Any chatter marks would also be disruptive on synchronization rings of manual transmissions. They have a disruptive effect there if they impair the synchronization effect and consequently allow the shifting dogs to come into contact when they undergo relative rotation, which is not only noisy but also detrimental to their service life.

Chatter marks are instances of waviness directed transversely with respect to the machining direction in the surface of a workpiece. The elevation of the waviness of the chatter marks, that is their amplitude, is disruptive even if they occur to a relatively slight extent, i.e. if the amplitude of the chatter marks is much less than the permissible random surface roughness. The periodicity of disruptive chatter marks is consequently superimposed very much by random roughness structures, which makes it more difficult for chatter marks to be sensed by measuring instruments. Added to this is the fact that the chatter marks are—as stated—directed transversely to the instances of machining roughness, for which reason they cannot be ascertained by the tracing stylus method because of the lateral sensitivity of tracing styluses.

German Patent document DE 197 40 141 C1 describes a method of ascertaining a twisting structure in the surface roughness of a finely-machined shaft journal, using a tracing stylus method. As a difference in comparison with the chatter marks mentioned at the beginning, the instances of waviness of a twisting structure are directed in the circumferential direction, that is, approximately parallel to the instances of machining roughness, and can therefore be mechanically felt in the axial direction. Furthermore, comparatively only a small information density is required for ascertaining the superficial twisting structure, so that the relatively slowly operating mechanical feeling method can still be used with a reasonable time expenditure.

There are various known types of high-resolution surface-measuring methods with which a data record representing the actual microstructure or microtopography of a workpiece surface can be generated. Firstly, the interferometry method, in particular that of white-light interferometry, comes into consideration in this connection as a method of representing the microstructure of a finely-machined surface. Secondly, data on a surface microstructure can also be ascertained by the method of microstrip projection. Devices based on these measuring methods are commercially available.

On the basis of the prior art described above, the object of the invention is to present a method of ascertaining chatter marks in a finely-machined surface of a workpiece extending in the circumferential direction, with which at least the extent of the degree of severity of any chatter marks, but preferably also their circumferential position on the circumference of the workpiece, can be qualitatively and objectively determined. A qualitative indication in this respect is important on the one hand for quality assurance purposes, i.e. it must be possible to determine with respect to the presence of any chatter marks a characteristic assessment number which represents the extent of any chatter marks present on a particular workpiece surface. On the other hand, it is significant with regard to the research into causes of the occurrence of chatter marks in the case of particular final machining processes and with regard to production monitoring that chatter marks occurring can be localized and can be objectively and reproducibly quantified with respect to their degree of severity.

This object is achieved according to the invention by providing a method of qualitatively ascertaining the degree of severity and/or circumferential position of any chatter marks in a fine-machined surface of a workpiece extending in the circumferential direction. Firstly, a data record—referred to hereafter as the "ideal-form data record"—is generated from the idealized macroform of the workpiece surface in a data-processable form with the surface data of a type and density corresponding to the type and density of the surface data generated in the subsequent method step. Then, by means of a contactlessly operating measuring method which senses the microtopography of the workpiece surface two-dimensionally in the form of a close grid of surface points and resolves this microtopography at least to the depth of the actual surface deviations such as instances of waviness and/or roughness, a data record representing this microtopography is generated from the actual workpiece surface, at least in the region in which chatter marks are presumed,—hereafter referred to as the "actual-form data record". The position of the surface points contained in the recorded grid is described by their respective spatial coordinates. A new data record—hereafter referred to as the "flat-form raw-data record", which represents a seemingly unrolled, stretched-out-flat form of the microtopography of the workpiece surface, is generated by subtraction of the coordinate values directed orthogonally with respect to the workpiece surface—referred to hereafter as "Z coordinates" for short—of mutually corresponding surface points from the data of the ideal-form data record from the Z coordinates of the actual-form data record. The flat-form raw-data record is subjected to a digital in-phase bandpass filtering with respect to the instances of waviness directed in the circumferential direction of the workpiece surface of the data sequence of the Z coordinates, those instances of waviness of which the period length lies in the range of the period length of the chatter marks to be expected preferably being allowed to pass. Consequently, a further data record—hereafter referred to as the "flat-form filter-data record"—is generated, representing a seemingly unrolled, stretched-out-flat form of the microtopography of the workpiece surface that has been corrected to eliminate random instances of roughness. The flat-form filter-data record is for its part subjected to a stationary multiple cross correlation, in that the Z coordinates of the surface points lying in the same position in the circumferential direction of the workpiece surface are in each case multiply correlated with one another, generating a further, but now only two-dimensional, data record—referred to hereafter as the "chatter-mark data record"—, which represents the circumferential position of any chatter marks on the workpiece surface and their degree of severity.

The main idea of the invention is the special type of evaluation of the surface data, leading to the qualitative indication concerning the degree of severity and/or circumferential position of any chatter marks.

Accordingly, a contactlessly operating, high-resolution surface-measuring method is used to generate from the workpiece surface a data record representing the actual microstructure of the workpiece surface and to take away from this a data record representing the idealized macroform of the workpiece surface and in this way to generate a data record representing the flat-extended form of the microstructure of the workpiece surface. This data record is subjected to a digital in-phase bandpass filtering with respect to its circumferential waviness, the instances of waviness of interest here of the chatter marks preferably being allowed through. The data record formed in this way is for its part subjected to a stationary multiple cross correlation with respect to the transverse direction. This produces an only two-dimensional data record representing the circumferential position of any chatter marks on the workpiece surface and their degree of severity.

Expedient refinements of the invention are described herein.

Other objects, advantages and novel features of the present invention will become apparent from the following detailed description of the invention when considered in conjunction with the accompanying drawings.

BRIEF DESCRIPTION OF THE DRAWINGS

FIG. 4 shows a basic representation of a device for white-light interferometry for the contactless, three-dimensional sensing of the microstructure of a workpiece surface;

FIG. 5 shows a side view of an actual white-light interferometer;

DETAILED DESCRIPTION OF THE DRAWINGS

Figure 1:
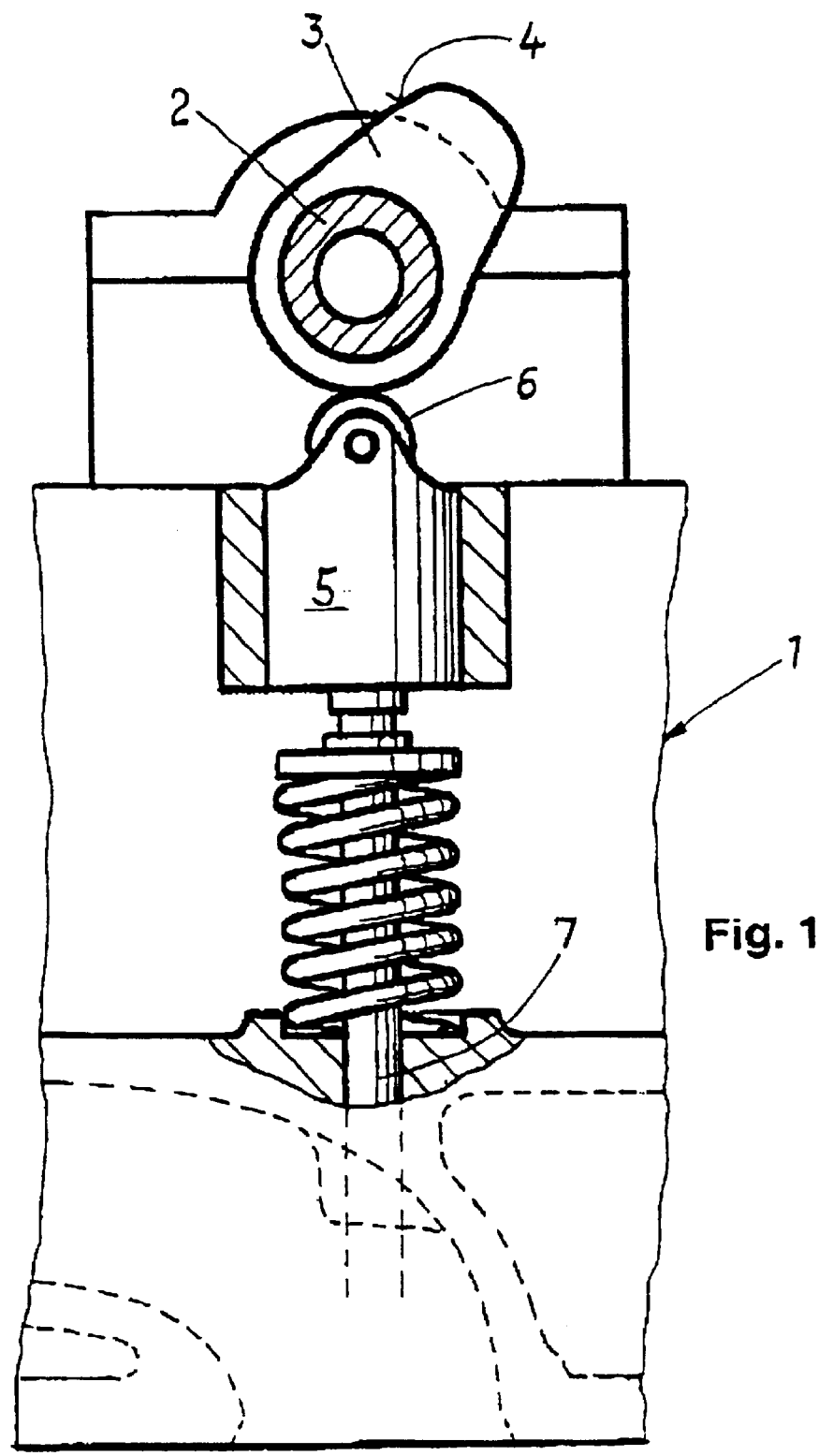
FIG. 1 shows a cam-actuated valve drive using a roller tappet.
Figure 2:
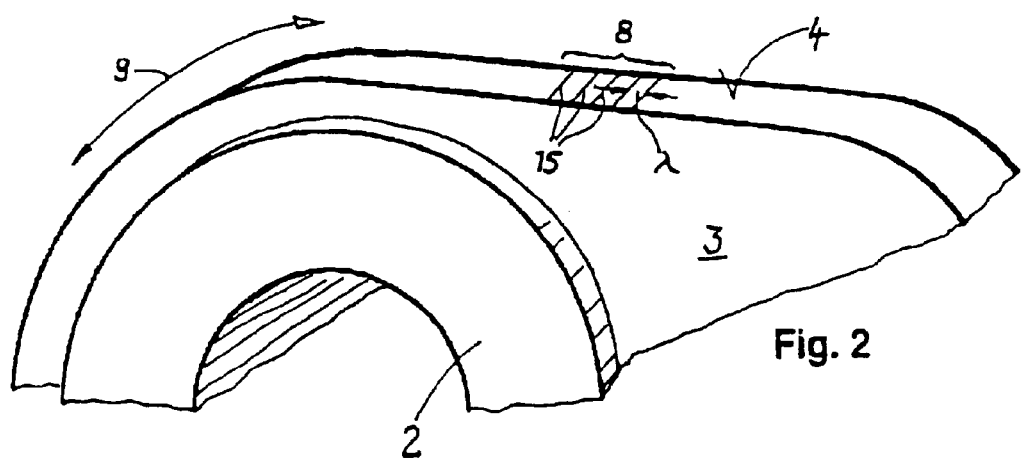
FIG. 2 shows a perspective, partial individual representation of a cam of the camshaft according to FIG. 1 on an enlarged scale.

The method of ascertaining chatter marks according to the invention is to be presented by the example of the fine-machined working surface 4 of a cam 3, which is represented in FIGS. 1 and 2 and which may be provided (FIG. 2) with undesired chatter marks 8 in the region of a cam surface. In recent times, the camshafts 2 mounted on the cylinder head 1 in internal combustion engines have been assigned roller tappets 5, which actuate the valves 7 of the engine via tappet rollers 6. This type of cam actuation advantageously allows a particularly rapid opening of the valves on account of concave portions in the cam surfaces. However, a disadvantage of this type of valve drive is that tappet rollers 6 react particularly sensitively to chatter marks 8, by producing noise. In addition, chatter marks have a greater tendency to form during the production of the working surfaces 4 of this type of cam, provided with turning points in the cam profile.

The working surface 4 is finely-machined in the circumferential direction 9 (FIG. 2). On account of any vibrations of the machining tool during the rotation of the workpiece, chatter marks 8 may occur. These are then directed, with their instances of waviness 15 lying in the workpiece surface, transversely to the machining direction, which coincides with the circumferential direction 9. On account of the cause for the chatter marks to occur, that is relative vibrations between the workpiece and tool during the fine machining, chatter marks which have occurred are of a highly periodic structure; neighbouring wave peaks 15 of the instances of waviness therefore have a mutual spacing which varies only little, that is a certain wavelength $\lambda$. Since, however, even very small elevations of the waviness of chatter marks are disruptive, that is when the amplitude of the chatter marks is much less than the permissible random surface roughness of the working surface 4, the periodicity of disruptive chatter marks is consequently superimposed very much by random roughness structures, which makes it more difficult for chatter marks to be sensed by measuring instruments. The random instances of roughness are approximately four times as high as the elevations of the instances of waviness of disruptive chatter marks. Only much lower instances of waviness of the chatter marks would be not very disruptive and, under certain circumstances, could be tolerated. Added to this is the fact that the chatter marks are—as stated—directed transversely to the instances of machining roughness, for which reason they cannot be ascertained by the methods of mechanically operating tracing stylus methods.

To allow chatter marks 8 which occur on the fine-machined surface 4 of the cam 3 nevertheless to be positively ascertained in a reproducibly accurate and objective manner with regard to their degree of severity and/or circumferential position, a different approach must therefore be adopted. Because of the great extent to which the waviness of the chatter marks is superimposed by random roughness components, according to the invention the microtopography of the entire surface region of interest is initially sensed in an elaborate way with a very high volume of data and the data of the waviness of the chatter marks is isolated from this by sophisticated evaluation and processing of these surface data.

To ascertain the topography data, a contactlessly operating surface-measuring method known per se is used, sensing the microstructure of the workpiece surface 4 two-dimensionally in the form of a close grid of surface points and resolving this microstructure at least to the depth of the actual surface deviations such as instances of waviness and/or roughness. In this connection, the methods of white-light interferometry or microstrip projection come into consideration, more precise details of which are to be given further below in conjunction with FIGS. 4 and 5 (white-light interferometry) and in conjunction with FIG. 11 (microstrip projection).

First of all, closer attention is to be paid to the device represented in FIGS. 4 and 5 for contactlessly sensing the microtopography of the workpiece surface, which operates on the basis of the method of white-light interferometry known per se. The device represents in principle a microscope 30 focused on the surface 4, with a specimen objective 22 and an eyepiece objective 23. Instead of a human observer, in the case of the white-light interferometer according to FIG. 4 or 5, there is fitted on the eyepiece objective a digital camera 25, which contains an array of photodiodes with a high pixel density. The scale of magnification of the microscope and the pixel density of the digital camera are responsible for the resolution of the white-light interferometer.

Between the two objectives 22, 23, white light is reflected from a light source 20 into the path of rays via a reflecting prism 21. The specimen objective 22 is connected to a partially transparent mirror 24. It is important in this case that the distance "a" from the partially transparent mirror 24 to the surface 4 under investigation is much less than the coherent length of the light emitted by the light source 20, in order that interference occurs between the light component reflected back from the planar mirror and the light component sent back from the surface 4, containing information on the distance from the individual surface points via the changed phase position of the lightwave trains.

The white-light interferometer is represented in FIG. 5 from a more practical viewpoint. On a portal 32 with a foot 33, the microscope 30 with the digital camera 25 is secured in such a way that it can be moved up and down over the portal opening by means of a vertical carriage guide 31. Fitted under the microscope is a specimen holder, to be specific a work stage 26, which can be manipulated with respect to four degrees of freedom of movement by means of a slide 27 and a two-dimensional pivoting device 28. In the case of the exemplary embodiment represented, a camshaft 2 is mounted in a positionally stable manner on the work stage 26 in two supports 29, the microscope being aligned with the working surface of a cam 3 to be investigated.

Interference lines are formed in the in-focus region of the surface 4, which follow the "contour lines" of the microtopography. The image of the surface 4 picked up by the digital camera can be observed by an operator via the monitor (not shown) of a connected computer. The surface is not aligned exactly orthogonally to the optical axis of the microscope but with a slight inclination, so that the exactly focused region in which the interference lines are also located is restricted to a relatively narrow strip within the observation portion that can be picked up by the specimen objective 22. If the distance of the surface 4 in relation to the microscope is then changed, the strip-shaped, focused region and the interference lines shift transversely over the observation portion that can be picked up, with a change in the contrast of the interference lines for each individual image point. During this change in the distance, on the one hand the travel in relation to a known reference point is continuously also picked up as a Z coordinate. Furthermore, during such a change in distance, the digital image produced by the digital camera is evaluated to the extent that, for each individual pixel, the Z coordinate at the moment of the greatest contrast of the interference is recorded and is output as a height coordinate of the corresponding point in the microtopography. The white-light interferometer consequently produces within an observation portion that can be picked up by the specimen objective 22 the Z coordinate of the microtopography of the surface 4 for a close grid of surface points predetermined by the pixels of the digital camera.

Figure 3:
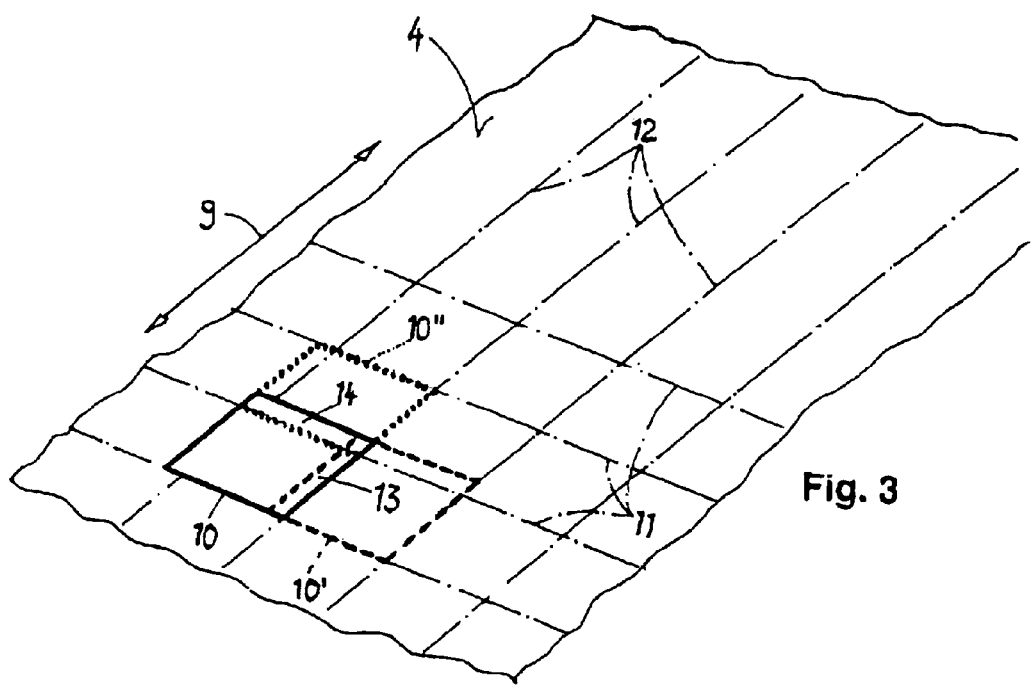
FIG. 3 shows a further enlarged representation of a detail from the working surface of the cam according to FIG. 2 with the observation portions arranged in a grid form for the data acquisition of the surface topography.

Since the microscopic operating method allows the microtopography to be sensed only in each case within a very small portion of the surface area, the microstructure of the workpiece surface 4 is initially sensed portion by portion—as indicated in FIG. 3—and the surface data are buffer-stored. In the example represented in FIG. 3, the individual portions 10, 10', 10" are arranged in sensing lines 11 arranged transversely to the circumferential direction 9 and in sensing tracks 12 aligned parallel to the circumferential direction. The distance between neighboring sensing lines 11 or sensing tracks 12 is less than the corresponding width or length of the individual portions 10, 10', 10", so that they overlap one another in a transversely lying marginal strip 14 and a longitudinally lying marginal strip 13. Individual portions are distributed without any gaps over the region of interest of the workpiece surface, so that the latter can be sensed completely in its microtopography. In the overlapping marginal strips 13 and 14, the surface data of the microtopography are even duplicated. The surface data sensed twice in the marginal strips are used for the purpose of putting together the data of the individual portions 10, 10', 10" positionally correctly to form a uniformly contiguous data record, so that finally a uniform data record of surface data of the microtopography representing the entire processed surface region is obtained. To distinguish from other data records, this data record is to be referred to hereafter as the "actual-form data record". The generated surface data of the microtopography represent the spatial coordinates of surface points of the microtopography that are closely neighboring and arranged in a grid form.

Figure 6:
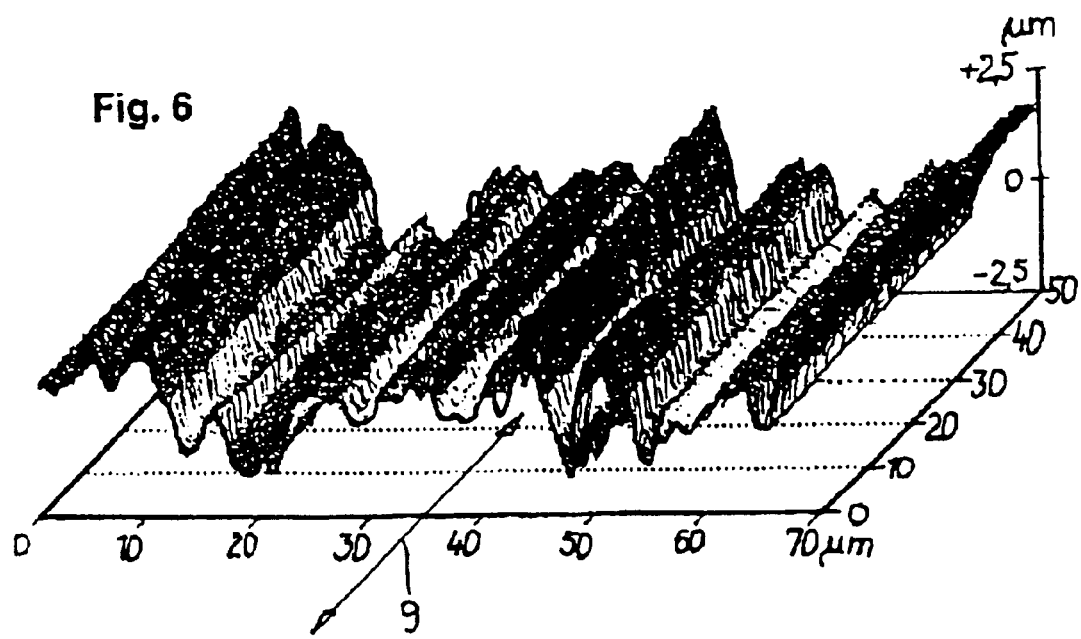
FIG. 6 is a greatly enlarged, perspective representation of the microtopography of a small detail measuring 50×70 $\mu$m from a workpiece surface, in which the instances of machining roughness oriented in the circumferential direction can be seen in particular.

In FIG. 6, the microtopography of such an individual portion with the dimensions 50×70 μm is represented perspectively, the circumferential direction 9 also being indicated. It can be seen that the instances of machining roughness, of an overall difference in height of approximately 5–7 μm from the highest point to the lowest point, are directed very much in the circumferential direction. These are grinding notches of individual grinding particles of the grinding wheel fine-machining the surface 4. The grinding notches directed in the circumferential direction 9 have an elongated shape, in principle of a boat-shaped form, and—depending on the radius of curvature of the surface 4, the diameter of the grinding wheel used and the advancing rate during grinding—are approximately 0.1 to 1.5 mm long. The width of the grinding notches—approximately 5–15 μm—can be seen in FIG. 6. Chatter marks, i.e. periodic instances of waviness lying transversely to the circumferential direction and transversely to the instances of machining roughness shown in FIG. 6, would be disruptive even if their elevations were to fluctuate with respect to an average level by approximately ±1 μm. However, such changes cannot be seen on a topography such as that of which a small detail is represented in FIG. 6, even if acquired surface data of a larger, contiguous portion of the surface area were represented in this way and viewed. The waviness of the chatter marks would be completely lost in the topography represented in this way. Expressed in signalling terms: the weak useful signal, that is the waviness of the chatter marks, would be lost in interfering noise of a much higher level, that is the random surface roughness.

The surfaces to be investigated with regard to chatter marks are generally not planar surface forms but instead—as in the example according to FIGS. 1 and 2—complicated, non-planar surface forms. The data on the desired form of the surface are usually already available in the form of a data record, to be precise simply because numerically controlled (NC) machine tools are controlled using these desired-form data and then produce the surface to be fine-machined. If no such surface data of the idealized macroform of the workpiece surface are available for the surface under investigation, they would have to be generated in a preceding method step. Under certain circumstances, the same surface data of the actual surface could be used, with all the random and finer periodic deviations in form being removed from the surface data by suitable filtering and smoothing methods. This data record representing the idealized macroform of the workpiece surface is to be referred to hereafter as the "ideal-form data record". To be able to process both data records in a compatible manner, it would have to be ensured by suitable interpolation methods that the same type and density of surface data is present in the ideal-form data record as in the actual-form data record.

If the coordinate values directed orthogonally with respect to the workpiece surface—referred to hereafter as "Z coordinates" for short—of the surface points from the data of the ideal-form data record are then subtracted from the Z coordinates of the corresponding surface points of the actual-form data record, this subtraction produces a new data record, which represents a seemingly unrolled, stretched-out-flat form of the microtopography of the workpiece surface. This new data record is to be referred to hereafter as the "flat-form raw-data record".

The qualitative ascertainment of chatter marks 8 frequently relates to non-rotationally-symmetrical workpiece surfaces, such as for example in the present case, the working surfaces 4 of cams 3. In such a case, before the subtraction of the Z coordinates of the ideal-form data record from those of the actual-form data record, firstly the two data records must be made to coincide as far as possible in the circumferential direction 9. Only when the ideal-form data record and actual-form data record coincide circumferentially does the described subtraction of the Z coordinates take place. At the same time as the circumferential adaptation of the ideal-form data and actual-form data, the relative circumferential position of the actual-form data record is ascertained in relation to the non-rotationally-symmetrical workpiece surface 4. Since the surface data are ascertained without exact circumferential alignment in relation to the workpiece surface, the circumferential signal mentioned above can be used for the determination of the exact relative position of the surface data acquired. In this way, the generated flat-form raw-data record can also be assigned exact information with respect to its circumferential position.

In the further processing of the surface data for the purpose of isolating the waviness of the chatter marks, the flat-form raw-data record is subjected to a digital in-phase bandpass filtering with respect to the instances of waviness directed in the circumferential direction 9 of the workpiece surface 4, i.e. with respect to the data sequence of the Z coordinates. In this case, those instances of waviness of which the period length $\lambda$ lies in the range of the period length of the chatter marks 8 to be expected are allowed to pass. The period length of the disruptive chatter marks can be ascertained for example by means of an analysis of the disruptive noise. It contains frequency components which, taking into account the circumferential speed of the working surface 4, indicate the "frequency" or the wavelength of the chatter marks. For example, period lengths $\lambda$ of the instances of waviness of approximately 0.2–1 mm are allowed through in the bandpass filtering. Instances of longer waviness lying above this and of short waviness lying below this are suppressed.

Figure 7:
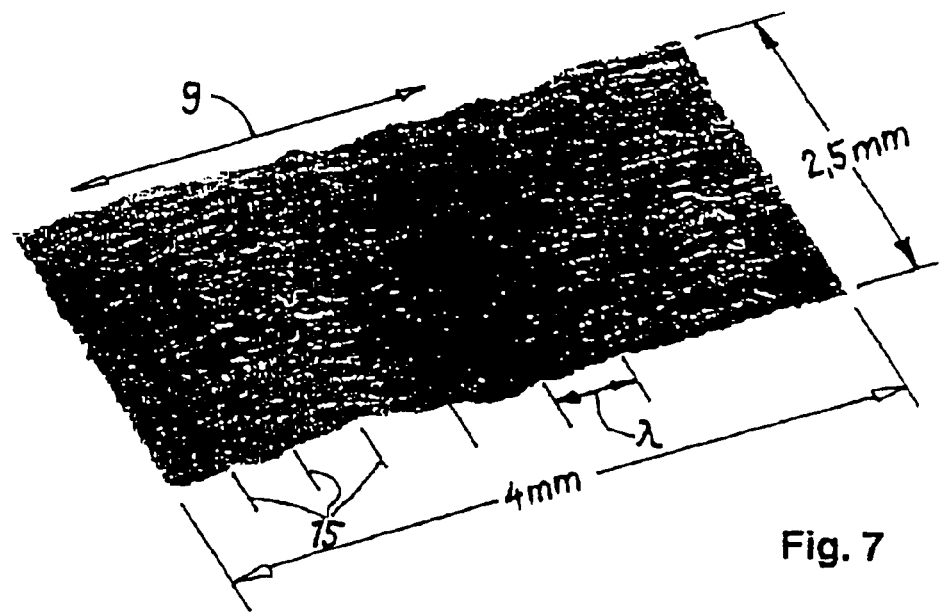
FIG. 7 shows a perspective, not so enlarged representation of the topography of a larger detail measuring 2.5×4 mm from a workpiece surface, in which instances of waviness running transversely to the circumferential direction, known as chatter marks, can be seen.
Figure 8:
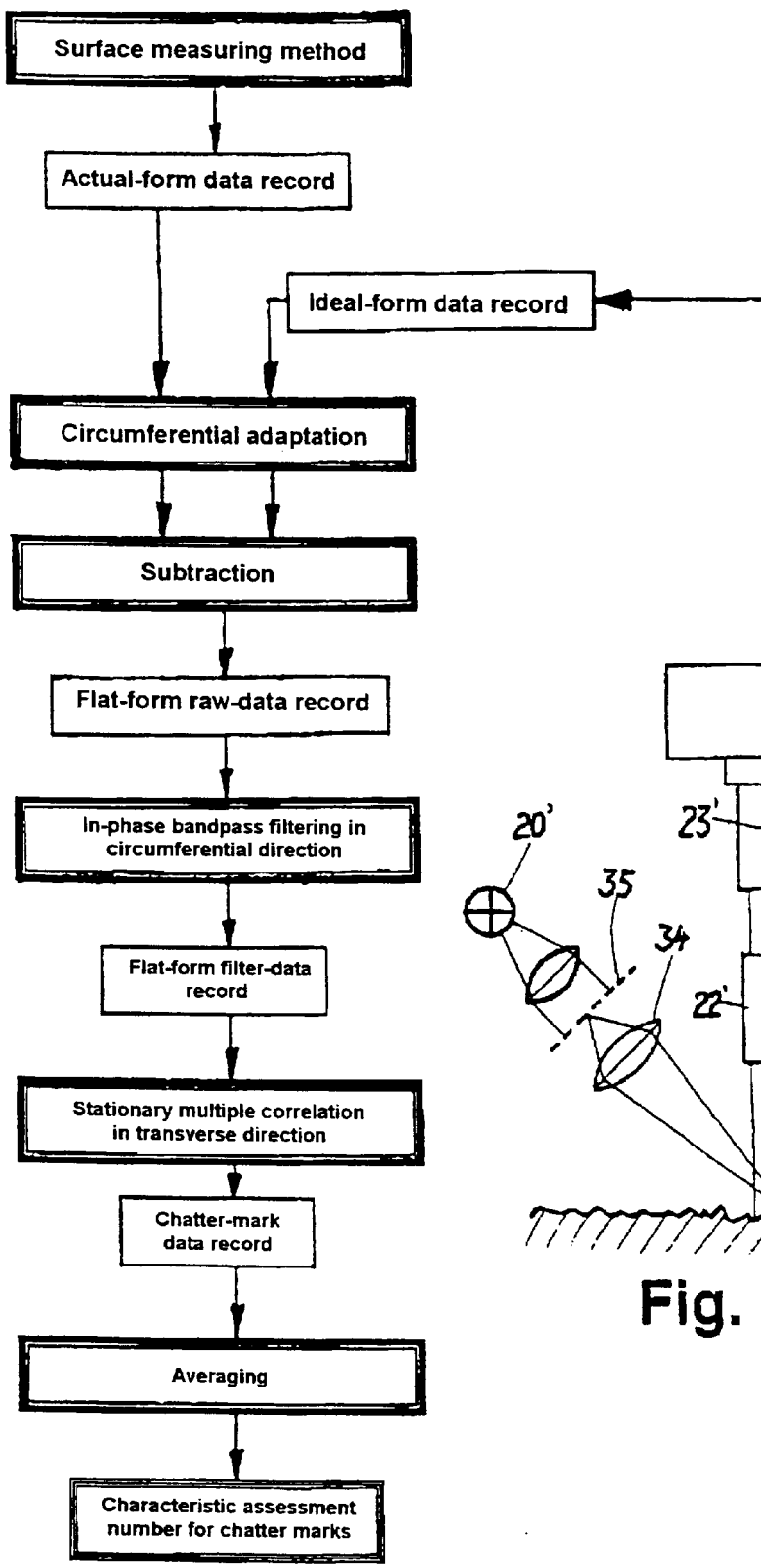
FIG. 8 shows a method-step diagram of the method according to the invention for ascertaining and further processing the surface data, up to obtaining a characteristic assessment number for chatter marks.

On the basis of the bandpass filtering with the correct transmission spectrum, a further data record—referred to hereafter as the "flat-form filter-data record"—is generated from the flat-form raw-data record. This new surface data record represents a seemingly unrolled, stretched-out-flat form of the microstructure of the workpiece surface 4 that has been corrected to eliminate random instances of roughness. In FIG. 7, such a flat-form filter-data record for a piece of a surface with the dimensions 4×2.5 mm is perspectively represented, the circumferential direction being indicated. The wave crests 15 of the waviness of the chatter marks which can be seen in this representation are indicated at the edge by parallel lines and their spacing, period length $\lambda$, is likewise depicted. Although such a representation can be used to present a waviness of chatter marks visually, this representation does not as yet contain any qualitative indication as to the extent of the perceptible chatter marks. In particular, the extent of the width of the chatter marks, directed transversely to the circumferential direction, cannot be seen in a representation such as that according to FIG. 7. If chatter marks were also to occur to a disruptive extent on a narrow strip of 2.5 mm, as in the example of FIG. 7, it is quite possible for no chatter marks, or chatter marks which are formed in phase opposition, to be encountered on a neighbouring strip at the same circumferential position of the working surface. Such chatter marks formed in phase opposition at one and the same circumferential point of the working surface of a workpiece are much less harmful than if the chatter marks are formed at least approximately in-phase over the entire width of the working surface.

To obtain from the previously obtained flat-form filter-data record transverse information with respect to the extent of the width and/or the phase coincidence of any chatter marks over the width, the data of the flat-form filter-data record are subjected to a stationary multiple cross correlation. To be precise, the Z coordinates of the surface points lying in the same position with respect to the circumferential direction 9 are in each case multiply correlated with one another. This stationary multiple cross correlation is used to generate a further, but now only two-dimensional, data record—referred to hereafter as the "chatter-mark data record" 40—, which represents the circumferential position of any chatter marks 8 on the workpiece surface 4 and their degree of severity (see FIG. 9).

Figure 9:
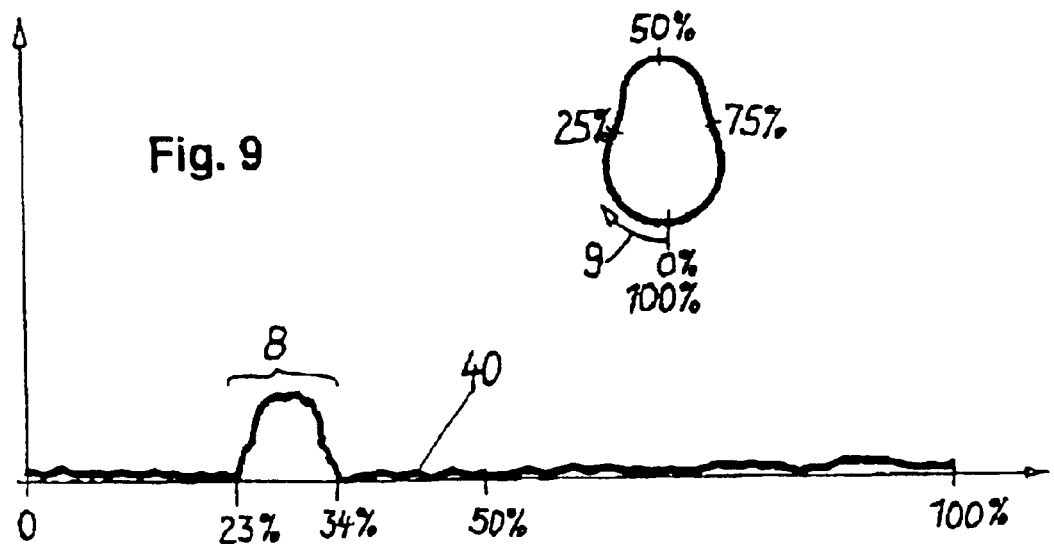
FIG. 9 shows a graphic representation of the data record on the chatter marks, obtained by the method according to the invention, as a line trace extending over the circumference of the assessed workpiece surface.
Figure 10:
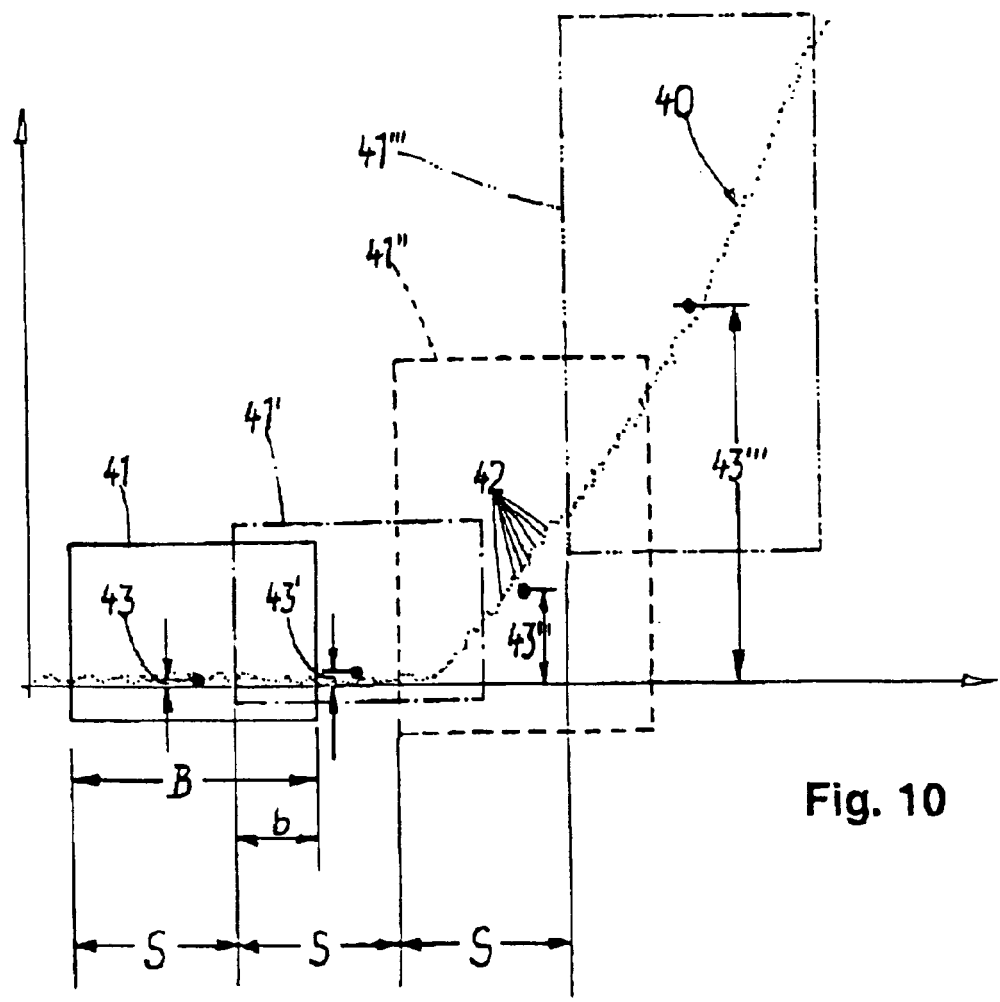
FIG. 10 shows a greatly enlarged representation of a detail of the data record on the chatter marks according to FIG. 9, details for a stage-by-stage averaging being represented.

In the diagram according to FIG. 9, such a chatter-mark data record 40 is represented as a line trace extending in the circumferential direction 9. In practice, such a line trace, including a quantitatively scaled network of coordinates, can be displayed on a monitor and/or printed out on paper. Although such a line trace already provides qualitative and objective information as to at which circumferential point chatter marks are present on the working surface and how pronounced they are, this information is of significance in particular for research into the causes in connection with the occurrence of chatter marks in the production of parts.

For describing and monitoring the quality of a component to be mass produced, however, it is necessary to be able to indicate a characteristic assessment number which corresponds in its magnitude to the degree of severity of chatter marks present on the workpiece. The more pronounced the chatter marks are and/or the larger the circumferential region of the working surface on which the chatter marks are located is, the higher the characteristic assessment number to be determined should be. Consequently, to be able to indicate such a characteristic assessment number, the chatter-mark data record 40 must be further evaluated.

Such a further evaluation of the chatter-mark data record for the purpose of forming a characteristic assessment number for chatter marks can take place for example by integration of the surface area beneath the chatter-mark data record 40 printed out as a line trace, which would be possible readily and quickly with the computing programs available today. Another possible way of generating a characteristic assessment number for chatter marks is that of averaging the Z coordinates of the chatter-mark data record 40.

The invention has found that a particularly meaningful characteristic assessment number for chatter marks can be determined if the averaging takes place stage by stage. To be precise, in a first stage, initially a data reduction is carried out by forming partial average values 43, 43', 43", 43'" within a locally restricted region. In a second stage of the averaging, to form a single average value, a certain weighting of the partial average values then takes place, leading to the specific indication of the characteristic assessment number for chatter marks thereby formed.

In the first stage of the averaging, the individual values 42 of the chatter-mark data record, which in each case lie within an averaging window 41, 41', 41", 41'" of a constant width but situated differently in the circumferential direction 9, are arithmetically averaged, which leads to a sequence of different, partial average values 43, 43', 43", 43'". In this case, for the formation of successive partial average values 43, the averaging window 41 is changed in its circumferential position in each case by a constant increment S which is less than the width B of the averaging window. Since the increment S is smaller than the width B of the averaging window, neighbouring averaging windows overlap by the amount of the difference, that is by the amount of overlap b.

The width B of the averaging window 41 corresponds approximately to the smallest period length λ of the waviness of chatter marks of interest and the increment S is approximately one third of the width B of the averaging window. In the second stage of the averaging, the various partial average values 43, 43', 43", 43'" are for their part arithmetically averaged. In this case, however, the maximum and minimum extreme values of the partial average values of the first stage are ignored. According to the experience of the applicant, the average value formed by this method as a characteristic assessment number for chatter marks correlates very well with the volume of the noise caused by the chatter marks and therefore correctly represents the extent of the chatter marks present with respect to the degree of severity and/or circumferential extent.

Figure 11:
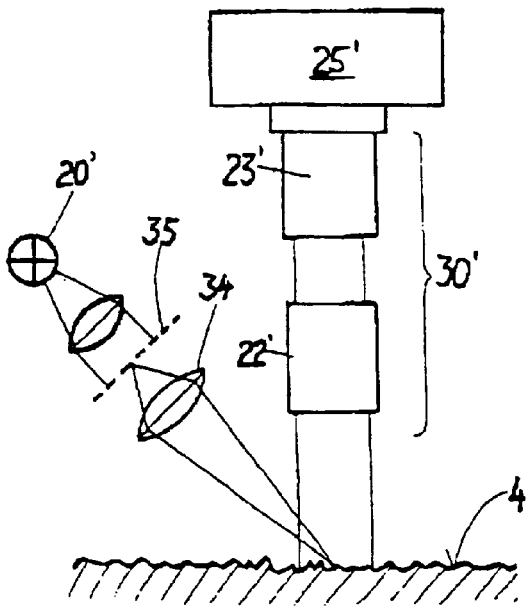
FIG. 11 shows a basic representation of a device for microstrip projection as a further method for the contactless, three-dimensional sensing of the microstructure of the workpiece surface.

For the sake of completeness, attention is briefly to be paid below, in connection with FIG. 11, to the method likewise known per se of microstrip projection, which could also be used for the purposes of the present invention, because with it the microtopography of a workpiece surface can be contactlessly sensed by measuring instruments and output three-dimensionally in the form of a close grid of surface points. The device for microstrip projection, represented only in its basic form in FIG. 11, is in principle a microscope 30' with a specimen objective 22', eyepiece objective 23', digital camera 25', portal (not represented) and manipulable specimen slide and connected evaluation computer. In the case of the microstrip projector, an intensively illuminated (light source 20') line pattern 35, which allows through very fine strips of light of different widths, is projected by means of projection optics obliquely with respect to the optical axis of the microscope 30' onto the surface 4 within the observing cutout of the microscope. The obliquely projected-in, rectilinearly bounded microstrips leave behind—from the viewing direction of the microscope—unstraight light/shadow boundary lines on the microtopography of the surface 4. By lateral variation of the position of the projected microstrips within the observing cutout of the microscope, the height coordinates of the microtopography at each individual pixel of the digital camera can be concluded from the change in form of the light/shadow boundary lines, and taking into account the position of the projected microstrips, by means of an intelligent evaluation of this change in form. Consequently, the method of microstrip projection ultimately produces a three-dimensional data record of all the surface points of the microtopography of the surface 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of qualitatively ascertaining information on chatter marks in a finely-machined surface of a workpiece extending in a circumferential direction, the method comprising the acts of:

generating an ideal-form data record from an idealized macroform of the workpiece surface in a data-processable form, said ideal-form data record being generated for surface data of a type and density corresponding to a type and density of surface data generated for an actual workpiece;

generating an actual-form data record via a contactless measurement that senses a microtopography of the workpiece surface two-dimensionally in the form of a close grid of surface points, said microtopography being resolved at least to a depth of actual surface deviations, positions of the surface points being described by respective spatial coordinates;

generating a flat-form raw-data record representing a flattened form of the microtopography of the workpiece surface by subtracting Z coordinate values directed orthogonally with respect to the workpiece surface of the ideal-form data record from mutually corresponding surface points of the actual-form data record;

digitally in-phase bandpass filtering the flat-form raw-data record for instances of waviness of the data sequence of the Z coordinates directed in the circumferential direction of the workpiece surface, instances of waviness having a period length lying within an expected period length of chatter marks being allowed to pass, said filtering step generating a flat-form filter-data record representing a flattened form of the microtopography of the workpiece surface corrected to eliminate random instances of roughness; and performing a stationary multiple cross correlation of the flat-form filter-data record by multiply correlating with one another the Z coordinates of the surface points lying in the same position in the circumferential direction of the workpiece surface, so as to generate a chatter-mark data record in two-dimensional form, said chatter-mark data record representing the information about the chatter marks.

2. The method according to claim 1, wherein said information includes the circumferential position of the chatter marks on the workpiece surface and a degree of severity of the chatter marks on the workpiece surface.

3. The method according to claim 1, wherein in digital in-phase bandpass filtering step, the filtering allows through instances of waviness having a period length approximately in the range of 0.2–1 mm.

4. The method according to claim 1, for the qualitative ascertainment of chatter marks (8) on non-rotationally-symmetrical workpiece surfaces, the method further comprises the following acts before subtracting the Z coordinates of the ideal-form data record from those of the actual-form data record;

substantially coinciding the ideal-form data record with that of the actual-form data record in the circumferential direction of the workpiece so that the circumferential position of the actual-form data record is ascertained in relation to the non-rotationally-symmetrical workpiece surface (4); and proceeding with the subtraction of the Z coordinates.

5. The method according to claim 1, wherein the step of generating the actual-form data record by sensing the microtopography of the workpiece surface comprises the steps of:

sensing individual portions of the workpiece surface;

combining the individual portions in a positionally correct manner to form a uniformly contiguous data record, said individual portions lying in a neighboring manner on the workpiece surface and together completely covering a surface region of the workpiece surface that is of interest in an overlapping manner, data in overlapping regions of two neighboring individual portions being respectively utilized to put together the individual portions in the positionally correct manner.

6. The method according to claim 1, further comprising the step of outputting the chatter-mark data record as a line trace extending in the circumferential direction of the workpiece surface.

7. The method according to claim 1, further comprising the step of evaluating the chatter-mark data record via an averaging of its Z coordinates.

8. The method according to claim 7, wherein the step of averaging occurs in stages, a first stage initially forming a sequence of different, partial average values, a partial average value being formed for the individual values of the chatter-mark data record which in each case lie within a circumferential increment of a constant width but situated differently in the circumferential direction forming an averaging window, said averaging window being changed in its circumferential position in each case by a constant increment less than width of the averaging window so as to form the sequence of different partial average values; and in a second stage, averaging the partial average values.

9. The method according to claim 8, wherein said second stage of averaging the partial average values ignores the maximum and minimum extreme values of the partial average values.

10. The method according to claim 8, wherein the width of the averaging window corresponds approximately to the period length of the smallest waviness of chatter marks of interest.

11. The method according to claim 8, wherein the increment is approximately one third of the width of the averaging window.

12. The method according to claim 8, wherein the values in the first stage and/or the values in the second stage are arithmetically averaged.

13. Method according to claim 1, further comprising the step of evaluating the chatter-mark data record by integrating respective surface areas lying between a line trace of the chatter-mark data record drawn as a diagram line and an associated X-axis.

14. The method according to claim 1, wherein the act of generating the actual-form data record uses white-light interferometry to sense the microtopography of the workpiece surface three-dimensionally in the form of the close grid of surface points.

15. The method according to claim 1, wherein the step of generating the actual-form data record uses microstrip projection to sense the microtopography of the workpiece surface three-dimensionally in the form of the close grid of surface points.

16. A method of qualitatively determining information on chatter marks formed in a fine-machined surface of a workpiece that extends in a circumferential direction, the method comprising the acts of:

obtaining an ideal macroform of the workpiece surface;

generating a data record representing an actual microtopography of the workpiece surface in a contactless manner;

forming a second data record representing a flattened form of the microtopography of the workpiece surface that extends in the circumferential direction;

filtering the second data record to substantially eliminate circumferential waviness, while allowing any chatter mark waviness to pass through;

subjecting the filtered second data record to a stationary multiple cross correlation with respect to a transverse direction to produce a two-dimensional data record representing the circumferential position of any chatter marks on the workpiece surface; and evaluating the two-dimensional data record to obtain the information on the chatter marks on the workpiece surface.

* * * * *